United States Patent
Bu et al.

(10) Patent No.: US 9,896,741 B2
(45) Date of Patent: Feb. 20, 2018

(54) METHOD OF PRODUCING METAL CARBONATE FROM AN ULTRAMAFIC ROCK MATERIAL

(71) Applicant: Agency for Science, Technology and Research, Singapore (SG)

(72) Inventors: Jie Bu, Singapore (SG); Tze Yuen Yeo, Singapore (SG); Paul Sharratt, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 28 days.

(21) Appl. No.: 15/107,870

(22) PCT Filed: Dec. 23, 2014

(86) PCT No.: PCT/SG2014/000613
§ 371 (c)(1),
(2) Date: Jun. 23, 2016

(87) PCT Pub. No.: WO2015/099612
PCT Pub. Date: Jul. 2, 2015

(65) Prior Publication Data
US 2016/0319395 A1    Nov. 3, 2016

(30) Foreign Application Priority Data

Dec. 24, 2013  (SG) ................. 2013095575

(51) Int. Cl.
*C22B 3/06* (2006.01)
*C22B 3/02* (2006.01)
(Continued)

(52) U.S. Cl.
CPC .............. *C22B 26/22* (2013.01); *B01D 53/62* (2013.01); *B01D 53/78* (2013.01); *C01F 5/06* (2013.01);
(Continued)

(58) Field of Classification Search
None
See application file for complete search history.

(56) References Cited

U.S. PATENT DOCUMENTS 3,785,797 A * 1/1974 Strelzoff ................. C05B 11/06
                                                             423/308
4,798,717 A    1/1989 Morency

FOREIGN PATENT DOCUMENTS

WO    2010088738 A1    8/2010

OTHER PUBLICATIONS

International Preliminary Report on Patentability for International Application No. PCT/SG2014/000613 dated Jun. 28, 2016, pp. 1-5.
(Continued)

*Primary Examiner* — Daniel Berns
(74) *Attorney, Agent, or Firm* — Winstead, P.C.

(57) ABSTRACT

A method of producing a metal carbonate from an ultramafic rock material is provided. The method includes providing an ultramafic rock material comprising a metal silicate; reacting the ultramafic rock material with an acid to form a mixture comprising a salt of the metal; contacting the mixture comprising a salt of the metal with oxygen so as to aerate impurities in the mixture and/or to remove residual acid from the mixture; heating the resultant mixture to decompose the salt of the metal to form metal oxide; and reacting the metal oxide with aqueous ammonium carbonate to obtain the metal carbonate. A system for producing a metal carbonate from ultramafic rock material is also provided.

20 Claims, 5 Drawing Sheets

(51) Int. Cl.
    *C22B 3/10*     (2006.01)
    *C22B 3/20*     (2006.01)
    *C22B 3/46*     (2006.01)
    *C01F 5/06*     (2006.01)
    *C01F 5/24*     (2006.01)
    *C01F 11/04*     (2006.01)
    *C01F 11/08*     (2006.01)
    *B01D 53/18*     (2006.01)
    *C22B 26/22*     (2006.01)
    *B01D 53/62*     (2006.01)
    *B01D 53/78*     (2006.01)

(52) U.S. Cl.
    CPC .................. *C01F 5/24* (2013.01); *C22B 3/02* (2013.01); *C22B 3/10* (2013.01); *C22B 3/46* (2013.01); *B01D 2251/402* (2013.01); *B01D 2251/60* (2013.01); *B01D 2252/102* (2013.01); *B01D 2257/504* (2013.01); *B01D 2258/0283* (2013.01); *Y02C 10/04* (2013.01); *Y02P 20/152* (2015.11)

(56) References Cited

OTHER PUBLICATIONS

Written Opinion for International Application No. PCT/SG2014/000613 dated Mar. 16, 2015, pp. 1-4.

\* cited by examiner

METHOD OF PRODUCING METAL CARBONATE FROM AN ULTRAMAFIC ROCK MATERIAL

CROSS-REFERENCE TO RELATED APPLICATION

This application claims the benefit of priority of Singapore patent application No. 201309557-5 filed on 24 Dec. 2013, the content of which is incorporated herein by reference in its entirety for all purposes.

TECHNICAL FIELD

The invention relates to methods of producing metal carbonate from an ultramafic rock material.

BACKGROUND

Heavy industries such as steel making, coal gasification, metal refineries, power plants and cement making units emit a significant amount of carbon dioxide ($CO_2$). Taking Singapore, for example, it was estimated that amount of carbon dioxide from power plants will exceed 20 million tonnes per year for the next decade (see TABLE 1).

TABLE 1

Carbon dioxide ($CO_2$) emissions from power plants in Singapore (2007-2017)

| Power Plant | 2007 Energy and $CO_2$ Emission | | | 2017 Energy and $CO_2$ Emission | | |
|---|---|---|---|---|---|---|
| | Energy MWh/a | $CO_2$ Emission Mt $CO_2$/a | Emission rate t $CO_2$/hr | Energy MWh/a | $CO_2$ Emission Mt $CO_2$/a | Emission rate t $CO_2$/hr |
| TUAS | 8,867,275 | 4.00 | 457 | 17,100,000 | 13.20 | 1507 |
| PULAU SERAYA | 8,297,868 | 3.93 | 448 | 13,000,000 | 6.00 | 685 |
| SENOKO | 11,200,000 | 4.45 | 508 | 11,500,000 | 4.56 | 520 |
| PULAU MERLIMAU | 0 | | | 2,931,124 | 1.29 | 147 |
| ISLAND POWER | 0 | | | 2,537,875 | 1.27 | 145 |
| PULAU SAKRA | 2,090,103 | 0.87 | 100 | 2,177,497 | 0.91 | 104 |
| SINGAPORE CHEMICAL | 684,577 | 0.38 | 43 | 1,610,593 | 0.83 | 95 |
| JURONG | 325,714 | 0.15 | 18 | 363,860 | 0.17 | 19 |
| SINGAPORE OLEFINS | 318,406 | 0.15 | 17 | 332,227 | 0.16 | 18 |
| CHANGI WWTP | 257,303 | 0.12 | 14 | 276,999 | 0.13 | 15 |
| SMPO COGEN | 173,321 | 0.11 | 12 | 182,392 | 0.11 | 13 |
| PASIR PANJANG | 185,081 | 0.09 | 10 | 200,664 | 0.10 | 11 |
| Total | 32,399,648 | 14.3 | | 52,213,230 | 28.7 | |

Source: http://carma.org/region/detail/169

Carbon dioxide capture and storage by mineralization has been proposed as a possible technology to reduce global carbon dioxide levels. The technology may include extracting cations from feed material such as rocks, and combining the cations with carbon dioxide to form a stable carbonate material. Due to the large quantities (gigatonnes) of material involved, ability to extract metal from the feed material at high efficiencies is important. Limitations to existing processes include low metal extraction yields and high energy consumption, due to removal of water which has high latent and sensible heat.

In view of the above, there exists a need for improved methods of producing metal carbonate from an ultramafic rock material, thereby capturing carbon dioxide from the atmosphere or environment, which overcome or at least alleviate one or more of the above-mentioned problems.

SUMMARY

In a first aspect, a method of producing a metal carbonate from an ultramafic rock material is provided. The method comprises
  a) providing an ultramafic rock material comprising a metal silicate;
  b) reacting the ultramafic rock material with an acid to form a mixture comprising a salt of the metal;
  c) contacting the mixture comprising a salt of the metal with oxygen so as to aerate impurities in the mixture and/or to remove residual acid from the mixture;
  d) heating the resultant mixture from step c) to decompose the salt of the metal to form metal oxide; and
  e) reacting the metal oxide with aqueous ammonium carbonate to obtain the metal carbonate.

In a second aspect, a system for producing a metal carbonate from ultramafic rock material is provided. The system comprises
  a) a reactor configured to carry out reaction of an ultramafic rock material with an acid to form a mixture comprising a salt of the metal;
  b) an air stripper column configured to contact the mixture comprising a salt of the metal with oxygen so as to aerate impurities in the mixture and/or to remove residual acid from the mixture;
  c) a furnace configured to heat the resultant mixture from step b) to decompose the salt of the metal to form the metal oxide; and
  d) a precipitator configured to carry out reaction of the metal oxide with aqueous ammonium carbonate to form the metal carbonate.

BRIEF DESCRIPTION OF THE DRAWINGS

The invention will be better understood with reference to the detailed description when considered in conjunction with the non-limiting examples and the accompanying drawings, in which.

liquid redistributors; 106: blower assembly; 111: contaminant influent; 112: spray; 113: air in; 114: gas out to atmosphere or secondary treatment; and 115: treated effluent.

DETAILED DESCRIPTION

Using methods disclosed herein, carbon dioxide emitted from various sources, such as coal gasification and power plants, may be captured in the form of metal carbonates such as magnesium carbonate, without significant modification of existing infrastructure. The metal carbonates are thermodynamically stable and inert, and once bound, the carbon dioxide that is captured is not susceptible to re-emission into the atmosphere. Furthermore, the metal carbonates produced may be in solid form to render their ease of handling.

Various embodiments disclosed herein are particularly suited for long-term sequestration of carbon dioxide emitted from industries. Advantageously, systems for producing metal carbonate disclosed herein may be integrated into existing infrastructure of industries so as to utilize waste heat from the industries in production of metal carbonates. The metal carbonates produced may be used as building materials or for land reclamation purposes, or be used as additives for adding to polymers as fire retardants.

With the above in mind, various embodiments refer in a first aspect to a method of producing a metal carbonate from an ultramafic rock material.

The method includes providing an ultramafic rock material comprising a metal silicate; reacting the ultramafic rock material with an acid to form a mixture comprising a salt of the metal; contacting the mixture comprising a salt of the metal with oxygen so as to aerate impurities in the mixture and/or to remove residual acid from the mixture; heating the resultant mixture to decompose the salt of the metal to form metal oxide; and reacting the metal oxide with aqueous ammonium carbonate to obtain the metal carbonate.

As used herein, the term "ultramafic rock material" refers to igneous and meta-igneous rocks which are composed of more than 90% mafic minerals in various proportions with trace amounts of other minerals. The term "mafic" is used to describe a silicate mineral or rock that is rich in magnesium. Apart from magnesium, the ultramafic rock material may also contain metals such as iron, nickel, chromium, manganese and/or calcium as impurities.

Main mafic minerals include olivine ($Mg_2SiO_4$), orthopyroxene ($MgSiO_3$), and clinopyroxene (($MgCa)SiO_3$). Upon hydration, the corresponding mafic minerals are serpentine ($Mg_3Si_2O_5(OH)_4$), tremolite ($Mg_5Ca_2Si_8O_{22}(OH)_2$), and talc ($Mg_3Si_4O_{10}(OH)_2$).

Of particular importance is serpentine, as it is volumetrically dominant on a global scale. Typically, serpentine has a silica content of less than 45%, magnesium oxide content of greater than 18%, and a high iron oxide content in the range of about 5% to 15%. Content of serpentine may vary between the stated ranges depending on source and quality of the rock. TABLE 2 depicts composition of serpentine according to an embodiment. The values are obtained from direct measurements of the mineral samples using X-ray fluorescence spectroscopy.

TABLE 2

| Composition of Serpentine (Percentage expressed in terms of weight % of the respective oxides contained within the material) | | | | | | | |
|---|---|---|---|---|---|---|---|
| Element | MgO | $SiO_2$ | $Fe_2O_3$ | $Al_2O_3$ | $Cr_2O_3$ | CaO | NiO | MnO |
| Percent | 46.72 | 42.7 | 8.4 | 0.61 | 0.45 | 0.4 | 0.29 | 0.14 |

In various embodiments, the ultramafic rock material comprises or consists of serpentine.

As mentioned above, the ultramafic rock material is rich in magnesium. Accordingly, in various embodiments, the method of producing metal carbonate from an ultramafic rock material is used to produce magnesium carbonate. Molar ratio of metal to carbonate ($CO_3$) in the metal carbonate may be in the range of about 1:1 to about 5:4. In various embodiments, molar ratio of metal to $CO_3$ in the metal carbonate is about 1:1.

The method includes providing an ultramafic rock material comprising a metal silicate. In various embodiments, the metal silicate is magnesium silicate, such as $Mg_3Si_2O_5(OH)_4$. Apart from magnesium silicate, silicates of other metals contained in the ultramafic rock material may also be present, such as silicates of iron, nickel, chromium, manganese, and/or calcium.

Providing an ultramafic rock material comprising a metal silicate may include physically working the ultramafic rock material such as by crushing or grinding, so as to reduce size of the ultramafic rock material. Advantageously, by reducing size of the ultramafic rock material, liberation of metal from the ultramafic rock material may be accelerated.

In some embodiments, providing an ultramafic rock material includes physically working the ultramafic rock material to form ultramafic rock particles having a size of 0.5 mm or less. Size of the ultramafic rock particles may be characterized by its maximal dimension, wherein the term "maximal dimension" refers to the maximal length of a straight line segment passing through the center of a figure and terminating at the periphery.

For example, the ultramafic rock material may comprise or consist of ultramafic rock particles having a size of 0.5 mm or less, such as a size in the range of about 0.01 mm to about 0.5 mm, about 0.05 mm to about 0.5 mm, about 0.1 mm to about 0.5 mm, about 0.2 mm to about 0.5 mm, about 0.01 mm to about 0.3 mm, about 0.01 mm to about 0.1 mm, or about 0.1 mm to about 0.3 mm.

The method includes reacting the ultramafic rock material with an acid to form a mixture comprising a salt of the metal. In reacting the ultramafic rock material with an acid, metal from the ultramafic rock material may be leached out in the form of a metal salt. Hence, the mixture containing the salt of the metal may otherwise be termed as the leachate. A solid residue of coarse silica may also be obtained following reacting of the ultramafic rock material with acid.

The acid may, for example, be selected from the group consisting of hydrohalic acid, sulfuric acid ($H_2SO_4$), nitric acid ($HNO_3$), phosphoric acid ($H_3PO_4$), acetic acid ($CH_3COOH$), and combinations thereof. Depending on the acid used, different metal salts may be formed. For example, salt of the metal may be a halide such as a chloride or a bromide, a sulfate, a nitrate, a phosphate, and/or an acetate. In various embodiments, the acid is a hydrohalic acid, such as hydrofluoric acid (HF), hydrochloric acid (HCl), hydrobromic acid (HBr), and/or hydroiodic acid (HI). In some embodiments, the acid comprises or consists of hydrochloric acid and/or hydrobromic acid.

In specific embodiments, the acid comprises or consists of hydrochloric acid. By reacting the ultramafic rock material with hydrochloric acid, metal may be leached from the ultramafic rock material as metal chloride. Use of hydrochloric acid has been found by the inventors to be advantageous, as hydrochloric acid is able to leach metal effectively from ultramafic rock material, and may be regenerated easily and simply without complication. Undesirable decompositions do not take place upon heating of metal chlorides, as opposed to the case of metal nitrates formed from reacting metal silicates with nitric acid, for example, which may generate nitrite and nitrous products.

The mixture may accordingly contain chlorides of magnesium, iron, nickel, chromium, manganese, and/or calcium. Due to the high magnesium content in ultramafic rock material, the salt of the metal may mainly be made up of magnesium chloride.

In various embodiments, concentration of the hydrochloric acid is at least 27 wt % HCl. For example, concentration of the hydrochloric acid may be at least 30 wt %, at least 35 wt % HCl, or be in the range of about 27 wt % to about 35 wt %, about 27 wt % to about 32 wt %, or about 27 wt % to about 30 wt % HCl.

Reacting the ultramafic rock material with an acid may be carried out at a temperature in the range of about 80° C. to about 100° C. For example, reacting the ultramafic rock material with an acid may be carried out at a temperature in the range of about 80° C. to about 95° C., about 80° C. to about 90° C., about 80° C. to about 85° C., about 90° C. to about 100° C., or about 85° C. to about 95° C. In various embodiments, reacting the ultramafic rock material with an acid is carried out under continuous stirring to accelerate liberation of metal from the ultramafic rock material.

The method includes contacting the mixture comprising a salt from the metal with oxygen. The oxygen may be in the form of an oxygen flow and/or an air flow. This may be carried out to aerate impurities in the mixture and/or to remove residual acid from the mixture. As mentioned above, the ultramafic rock material may also contain metals such as iron, nickel, chromium, manganese and/or calcium as impurities. By contacting the mixture comprising a salt of the metal with oxygen, the metals may be aerated to their respective oxides and may be precipitated out from the mixture to allow their removal from the resultant mixture by a separation process such as decanting or filtering.

By way of example only, this aeration process may be illustrated using hydrochloric acid and iron. Iron may be leached from ultramafic rock material using hydrochloric acid to form iron (II) chloride (FeCl$_2$). The iron (II) chloride may be oxidized readily to iron (III) chloride (FeCl$_3$) upon contact with oxygen, as shown in equation (1):

$$12FeCl_2 + 3O_2 \rightarrow 2Fe_2O_3 + 8FeCl_3 \quad (1)$$

The iron (III) chloride may undergo auto-hydrolysis in solution to form iron (III) oxide and hydrogen chloride, as shown in equation (2):

$$2FeCl_3 + 3H_2O \rightarrow Fe_2O_3 + 6HCl \quad (2)$$

Iron (III) oxide may be precipitated out from the mixture following oxidation to allow their easy removal.

In various embodiments, contacting the mixture comprising a salt of the metal with oxygen to aerate impurities in the mixture comprises separating oxides of iron, nickel, chromium, aluminum and/or manganese from the resultant mixture following oxidation.

Further, from equation (2), it may be seen that by eliminating hydrochloric acid from the solution, conversion of iron (III) chloride into iron (III) oxide may be promoted. This means that metal impurities in the mixture may be removed to a greater extent by removing hydrochloric acid from the mixture. Advantageously, the removal of hydrochloric acid, which may arise from the auto-hydrolysis process as well as residual acid present in the mixture, may be carried out by contacting the mixture comprising a salt of the metal with oxygen.

Contacting the mixture comprising a salt of the metal with oxygen may be carried out in a flow of air and/or oxygen. In various embodiments, contacting the mixture comprising a salt of the metal with oxygen is carried out by air stripping. As used herein, the term "air stripping" refers to a process by which an air stream is used to remove dissolved gases or volatile components of a liquid. The air stripping may be carried out in an air stripper column. For example, the mixture comprising a salt of the metal may be introduced at the top of an air stripper column. The air stripper column may contain packing material to provide a larger contact surface area for aeration. Air may be introduced at the bottom of the air stripper column, such that the mixture flows in opposite direction to the ascending air while contacting each other. In so doing, the air may strip acid from the mixture. The air exits from the top of the air stripper column, while the resultant mixture, which has been at least partially stripped of acid, may leave the bottom of the air stripper column for channeling into a subsequent stage.

In various embodiments, contacting the mixture comprising a salt of the metal with oxygen is carried out under conditions such that pH of the mixture is less than or equal to 9. For example, the contacting may be carried out under conditions such that pH of the mixture is in the range of about 3 to about 9, about 5 to about 9, about 7 to about 9, about 3 to about 7, about 3 to about 5, about 5 to about 7, or about 4 to about 6.

Contacting the mixture comprising a salt of the metal with oxygen may be carried out at a temperature in the range of about 150° C. to about 250° C., such as about 180° C. to about 250° C., about 200° C. to about 250° C., about 150° C. to about 220° C., about 150° C. to about 200° C., about 180° C. to about 220° C., or about 180° C. to about 200° C. In various embodiments, contacting the mixture comprising a salt of the metal with oxygen is carried out at a temperature in the range of about 180° C. to about 200° C. In some embodiments, contacting the mixture comprising a salt of the metal with oxygen is carried out at a temperature of about 200° C.

By contacting the mixture comprising a salt of the metal with oxygen at elevated temperatures, water may be evaporated or vaporized from the mixture to form steam. In various embodiments, contacting the mixture comprising a salt of the metal with oxygen is carried out for a time period suitable to form a mixture saturated with the salt. Advantageously, by removing water from the mixture, this minimizes water content in the mixture for removal in a subsequent stage. At the same time, heat energy may be recovered in the form of steam for rechanneling back into the process.

By removing water from the mixture, a hydrated salt of the metal may also be formed. In various embodiments, the hydrated salt of the metal comprises or consists essentially of magnesium chloride hydrates. Water of crystallization of the hydrated metal salt may be in the range of about 2 to about 6, such as 2, 3, 4, 5, or 6.

The method of the first aspect includes heating the resultant mixture following contact with oxygen to decompose the salt of the metal to form metal oxide. For example, the metal oxide may contain magnesium oxide, along with trace amounts of oxides of iron, nickel, chromium, manganese, and/or calcium which may not have been removed in an earlier stage.

In various embodiments, heating the resultant mixture is carried out at a temperature in the range of about 400° C. to about 600° C., such as about 450° C. to about 600° C., about 500° C. to about 600° C., about 550° C. to about 600° C., about 400° C. to about 550° C., or about 450° C. to about 550° C. In specific embodiments, heating the resultant mixture is carried out at a temperature of about 550° C.

Given the high temperatures, steam may be generated. In embodiments where the acid is hydrochloric acid, and where residual acid is present in the resultant mixture not removed in an earlier stage, hydrogen chloride gas may additionally be produced.

The metal oxide is reacted with aqueous ammonium carbonate to obtain the metal carbonate. At the same time, aqueous ammonia may be produced.

The aqueous ammonium carbonate may be obtained by reacting carbon dioxide with aqueous ammonia, which may be carried out in a gas-liquid packed column. The carbon dioxide may be comprised in a flue gas, which may be channeled from heavy industries such as a power plant.

Molar ratio of aqueous ammonia to carbon dioxide may be in the range of about 2:1 to about 2.5:1, such as about 2.1:1, 2.2:1, 2.3:1, 2,4:1, or about 2.5:1.

In various embodiments, reacting carbon dioxide with aqueous ammonia is carried out at a pH of at least 9 to maximize degree of carbonation. For example, reacting carbon dioxide with aqueous ammonia may be carried out at a pH in the range of about 9 to about 13, about 9 to about 12, about 9 to about 11, about 9 to about 10, about 10 to about 13, about 11 to about 13, or about 10 to about 12. In some embodiments, reacting carbon dioxide with aqueous ammonia is carried out at a pH of at least 10.

Advantageously, reacting the metal oxide with aqueous ammonium carbonate may be carried out at ambient conditions.

Figure 5:
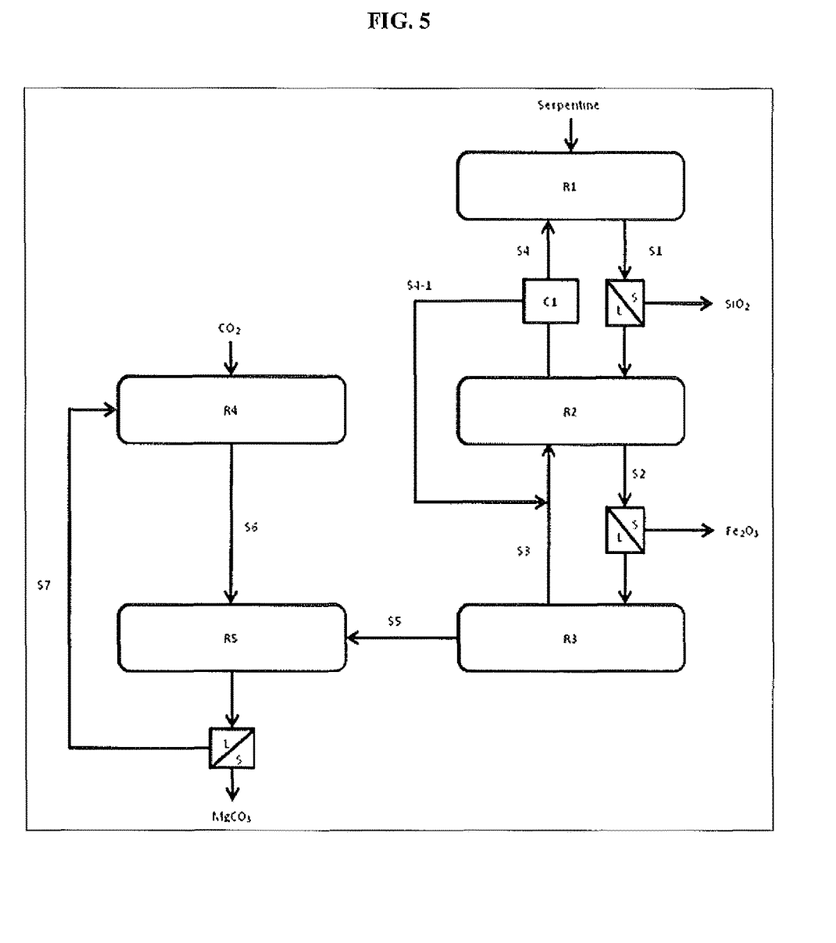
FIG. 5 is a schematic diagram showing general process flow for a system to carry out mineralization process according to embodiments.

In a second aspect, a system for producing a metal carbonate from ultramafic rock material is provided. The system comprises a reactor configured to carry out reaction of an ultramafic rock material with an acid to form a mixture comprising a salt of the metal; an air stripper column configured to contact the mixture comprising a salt of the metal with oxygen to aerate impurities in the mixture and/or to remove residual acid from the mixture; a furnace configured to heat the resultant mixture to decompose the salt of the metal to form the metal oxide; and a precipitator configured to carry out reaction of the metal oxide with aqueous ammonium carbonate to obtain the metal carbonate. Schematic diagram of a system for producing a metal carbonate from ultramafic rock material according to embodiments is shown in FIG. 5 and discussed in Example 8. Processing conditions for operating the various components of the system have already been discussed above.

In various embodiments, the system further comprises a gas-liquid packed column arranged upstream of the precipitator and configured to carry out reaction of carbon dioxide with aqueous ammonia to form aqueous ammonium carbonate. As mentioned above, the carbon dioxide may be comprised in a flue gas, which may be channeled from heavy industries such as a power plant. The ammonium carbonate that is formed may be used to react with the metal oxide to form metal carbonate. In so doing, carbon dioxide may be captured in the metal carbonate which is thermodynamically stable and inert, thereby rendering the carbon dioxide that is captured not susceptible for re-emission into the atmosphere.

The system may further comprise a compressor configured to compress acid vapor and/or water vapor from the air stripper column. This allows formation of higher quality steam that may be used to supplement heating medium that may be used for operating the air stripper column.

The system may, in various embodiments, comprise recycling means configured to recycle acid vapor and/or water vapor from the air stripper column and/or the furnace to the reactor and/or the air stripper column. In so doing, heat energy that is generated from the air stripper column and/or the furnace may be reused in other parts of the process, thereby minimizing energy consumption of the system.

In various embodiments, the system further comprises recycling means configured to recycle aqueous ammonia from the precipitator to the gas-liquid packed column. As mentioned above, metal oxide may be reacted with aqueous ammonium carbonate to obtain metal carbonate in the precipitator, while producing aqueous ammonia at the same time. By recycling the aqueous ammonia produced to the gas-liquid packed column, the aqueous ammonia may be reused to react with carbon dioxide to form aqueous ammonium carbonate.

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

As used herein, the term "and/or" includes any and all combinations of one or more of the associated listed items. The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Various embodiments described herein relate to a process to convert gaseous carbon dioxide from flue gas into a mineralized form, bound to alkaline earth metals obtained from ultramafic rocks. A general overall equation, employing serpentine ($Mg_3Si_2O_5(OH)_4$) as a representative starting material, to describe the process is as follows:

$$Mg_3Si_2O_5(OH)_4 + 3CO_2 \rightarrow 3MgCO_3 + 2SiO_2 + 2H_2O$$

The carbon dioxide is converted into a carbonate, which is thermodynamically more stable and inert. The solid form of the carbonate is easily handled and once bound, the carbon dioxide is not susceptible to re-emission into the atmosphere unless subjected to extreme conditions.

Improvements over state-of-the-art mineralization routes include:

a) lower energy consumption—It is readily apparent that the net $CO_2$ capture amount for the process described herein is positive, at least in cases where natural gas and oil are the preferred fossil fuels for combustion. This cannot be said for state of the art mineralization processes. The utilization of direct thermal energy significantly contributes to much lower $CO_2$ emissions per ton $CO_2$ captured. In the case of Singapore, which utilizes natural gas as the preferred fuel of choice for power generation, every 2,500 kWh produces one ton of $CO_2$. The amount of $CO_2$ avoided in this case is around 30%, if other assorted electrical energy uses (such as for agitation, milling, and pumping) are taken into account.

b) established fundamentals of reactions—kinetics and thermodynamics of decomposition, as well as processes of producing anhydrous $MgCl_2$ have been studied as $MgCl_2$ is an important precursor to electrolytic production of magnesium metal, and thus is of strategic importance.

c) avoidance of messy and uncontrollable side reactions— one distinct advantage of using an HCl as a leaching medium is that the regeneration reaction to yield acid is relatively uncomplicated. There are no unwanted secondary decompositions when heating is applied, unlike when nitrates are involved (there is a possibility of nitrite and nitrous products forming when pyrolysis of the nitrate salt occurs).

d) relatively small reactor sizes—the scale of operations, when it comes to carbon capture, often involves millions of tons of material being conveyed and pumped annually. Thus, it is desirable to use concentrated solutions or gases in order to reduce infrastructure and operating costs. In fact, one may even argue that a more concentrated solution facilitates certain steps in the process, such as the evaporation stages. Since magnesium chloride is highly soluble in water, a very concentrated leachate solution may be obtained, and thus only relatively small reactors are required.

e) ample opportunities to exploit waste heat streams from industry—heat may conveniently be recycled from many industries. The temperature requirements of this process fall in the medium range, at about 230° C. to 650° C. This may easily be obtained, for example, from the turbine exhaust of a gas fired power plant.

f) lower capital costs involved at startup—The equipment used may involve commercially available reactors such as agitated tanks, filters, and columns, thereby reducing the need to invest in new technology to design new reactor types or invest in non-standard equipment before commercialization.

g) significantly reduced energy penalty to power plant— As the main form of energy input is heat, there is no need to draw electrical energy from the power plant to drive the process. Thus, apart from some miscellaneous uses such as agitators, pumps etc, there is virtually no energy penalty to the power plant. This goes a long way towards keeping electricity costs to the consumer within acceptable ranges.

h) applications towards diverse industries: heavy industries such as steel making, coal gasification, metal refineries and cement making emit a significant amount of $CO_2$ in the manufacturing process. Incidentally, most of these industries involve large amounts of heating, and thus produce a lot of waste heat as well. Processes disclosed herein consume waste heat and sequesters $CO_2$, and would be a particularly suitable candidate to partner these industries.

Various embodiments seek to eliminate formation of ammonium chloride in the first place, thus avoiding additional regeneration steps and their associated complications altogether. As a substitute, metal chloride hydrolysis is employed as the preferred method to regenerate HCl.

There may be four distinct stages to the process, namely: 1) acid digestion of ultramafic mineral raw material; 2) removal of impurities from the leachate solution and concurrent evaporation of water; 3) regeneration of acid for further reuse in the acid digestion step; and 4) the actual mineralization reaction to produce alkaline earth metal carbonates from carbon dioxide.

The description of the process, from this point on, will use serpentine, which is a form of ultramafic rock material, as a representative starting mineral for illustration purposes.

Example 1: Acid Digestion of Ultramafic Mineral Raw Material and Purification of Leachate Serpentine, ground to particles with sizes of 0.5 mm or less, was reacted with an acid, preferably hydrochloric acid (HCl) to leach out the magnesium contained therein:

$$Mg_3Si_2O_5(OH)_4(s) + 6HCl(aq) \rightarrow 3\ MgCl_2(aq) + 2SiO_2(s) + 5H_2O \quad (1)$$

This extraction step is conducted at 80° C. to 100° C. in a continuously stirred tank reactor (CSTR).

The selection of acid used is of great importance, as it affects the reactor sizes and regeneration steps, as can be seen from descriptions later in the text. At least five types of commonly available acids (HCl, $H_2SO_4$, $HNO_3$, $H_3PO_4$ and $CH_3COOH$) were considered for the leaching step. Of the acids considered, HCl fulfils both the requirements of effective leaching and complication-free regeneration.

Magnesium salts of $SO_4^{2-}$ and $PO_4^{3-}$ were poorly soluble, necessitating larger reactors to accommodate the more dilute solution produced. Magnesium acetate was reasonably soluble, but the leaching rate was unsatisfactory due to acetic acid being a weak acid. Only $Mg(NO_3)_2$ offered comparable solution concentrations and leaching rates to $MgCl_2$. The kinetics of decomposition of $Mg(NO_3)_2$, however, is considerably more complicated and less well defined, as it involves the uncontrolled formation of numerous nitrogen species.

Example 2: Removal of Impurities from Leachate Solution and Concurrent Evaporation of Excess Water Iron, nickel, chrome, manganese and calcium also exist in serpentine ore as impurities such as that shown in TABLE 2.

Since it is nearly impossible to inhibit the co-extraction of these elements during the acid leaching step, it is necessary to remove them in a separate step to separate Fe, Ni, Mn and Cr oxides, which are high value added metal salts, to ensure that high purity magnesite is obtained at the end of the process. To this extent, the leachate solution is first filtered to remove the remaining silica. Next, iron dissolved in the leachate solution is precipitated either as hematite or any of its hydrated forms.

To accomplish this, the iron-containing leachate is passed through a heated air stripper to aerate the leachate solution and to flush off any remaining unreacted HCl that is dissolved in solution. Dissolved HCl is removed from the solution via contact with supplied air from the bottom of the stripper column, FIG. 1 describes the mechanisms of an air stripper column.

Figure 1:
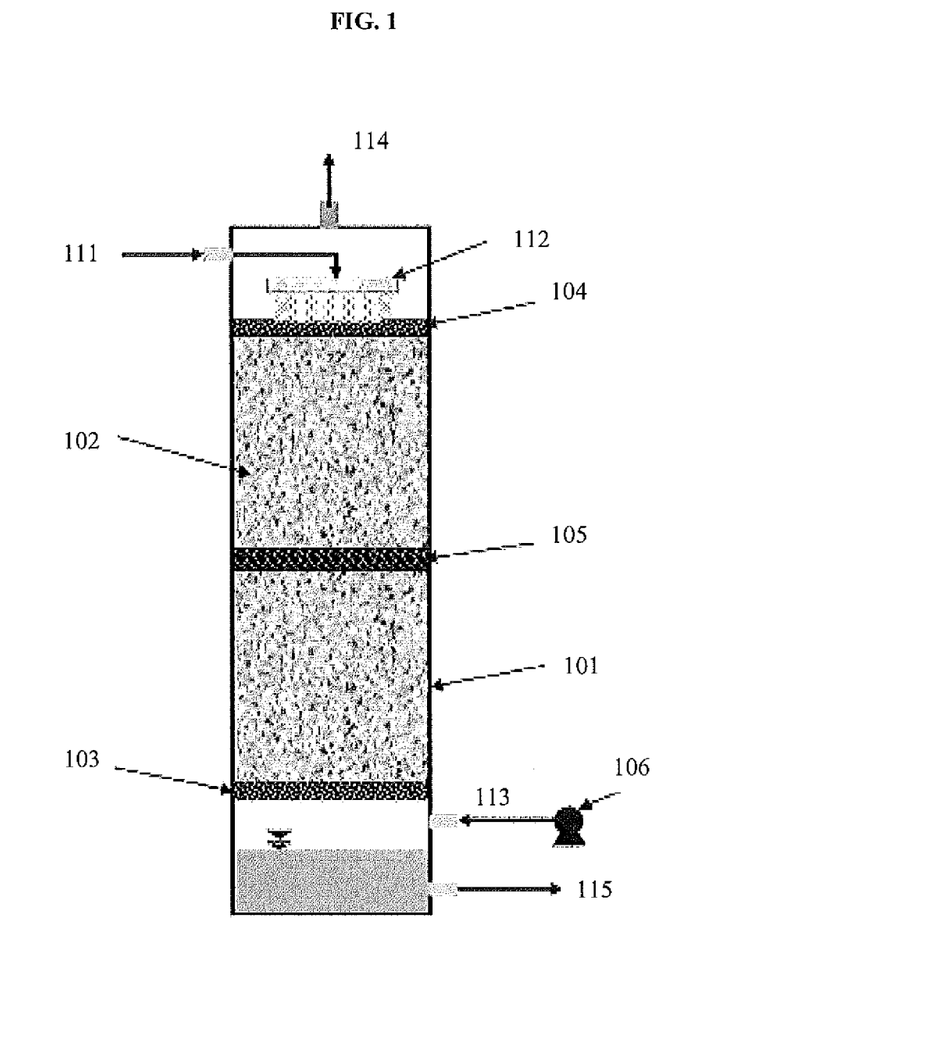
FIG. 1 is a schematic diagram depicting working mechanism of an air stripper column. Notations in the figures represent the following: 101: packed column; 102: packing material; 103: packing support; 104: packing restrainer; 105.

The rationale behind this stripping step is based on the facts that 1) ferrous chloride may be readily oxidized to ferric chloride via contact with oxygen:

$$12FeCl_2 + 3O_2 \rightarrow 2Fe_2O_3 + 8FeCl_3$$

and 2) iron chlorides in solution may undergo auto-hydrolysis to form iron oxides and hydrogen chloride:

$$2FeCl_3 + 3H_2O \rightarrow Fe_2O_3 + 6HCl$$

When combined, both reactions may result in the near-total conversion of iron chlorides into iron oxide solids.

Degree of auto-hydrolysis is governed by the following equation:

$$K_{eq} = \frac{\alpha[HCl]^6}{\alpha[FeCl_3]^2 \alpha[H_2O]^3}$$

Thus, it may be seen that by eliminating HCl from the solution, conversion of $FeCl_3$ into iron oxides may be promoted which may be conveniently filtered from the leachate solution. After removing the iron content, the filtrate is essentially a near saturated $MgCl_2$ solution. It should be noted that the iron oxidation and hydrolysis steps are ideally conducted at 200° C.

Apart from stripping HCl from the leachate solution, excess water may also be evaporated to yield magnesium chloride hexahydrate. It is important for concentration of the solution to be as high as possible, as this minimizes the amount of water that needs to be evaporated in a subsequent stage. A saturated leachate solution (circa 5 M of $MgCl_2$, or about 33 wt %) is ideal for operation purposes. In the case of a 33 wt % leachate solution, 5.11 mols of free water would have to be evaporated to yield 1 mol of $MgCl_2 \cdot 6H_2O$. The required heat for this evaporation is:

$$5.11H_2O(l) \rightarrow 5.11H_2O(g) \quad T_{min}=100° C., \Delta H=208 \text{ kJ/mol}$$

At 200° C., the hexahydrate salt also undergoes partial dehydration to produce a tetrahydrate salt, shown in the following equation:

$$MgCl_2 \cdot 6H_2O(s/l) \rightarrow MgCl_2 \cdot 4H_2O(s/l) + 2H_2O(g)$$
$$T_{min}=100° C., \Delta H=116 \text{ kJ/mol}$$

The total heat required to allow these transformations to occur was thus estimated to be at 323 kJ/mol $MgCl_2$.

The steam evolved from evaporation of excess water in this step may be recompressed in a mechanical vapor recompressor, resulting in higher quality steam that may be used to supplement the heating medium that is required for this step.

Scaling due to salt precipitation may be avoided, as at temperatures above 117° C., the hydrated salt melts into a molten salt hydrate (MSH). This molten $MgCl_2$ solution may then be transferred to the acid regeneration stage.

Example 3: Regeneration of Acid Solution

The molten salt hydrate may be decomposed into MgO and HCl, according to the following reactions (see Example 5 below for more information):

$$MgCl_2 \cdot 4H_2O(s/l) \rightarrow MgCl_2 \cdot 2H_2O(s/l) + 2H_2O(g)$$
$$T_{min}=134° C., \Delta H=134 \text{ kJ/mol}$$

$$MgCl_2 \cdot 2H_2O(s/l) \rightarrow MgOHCl(s) + HCl(g) + H_2O(g)$$
$$T_{min}=218° C., \Delta H=141 \text{ kJ/mol}$$

$$MgOHCl(s) \rightarrow MgO(s) + HCl(g) \quad T_{min}=550° C., \Delta H=98 \text{ kJ/mol}$$

The hydrated salt may first be dehydrated, and then undergoes hydrolysis in the presence of water to give hydrogen chloride gas and magnesium oxide. The overall reaction for decomposing $MgCl_2 \cdot 4H_2O$ may thus be:

$$MgCl_2 \cdot 4H_2O(s) \rightarrow MgO(s) + 2HCl(g) + 3H_2O(g) \quad T=550° C., \Delta H=373 \text{ kJ/mol}$$

An enormous amount of heat may be carried away from the furnace in the form of water vapour and HCl gas. According to the decomposition reaction formula, 3 mols of water vapour are formed for every mol of MgO produced, as well as 2 mols of HCl gas that when dissolved into water, yields 75 kJ/mol of dissolution heat. This heat may be reused in other parts of the process, most notably the impurity removal and evaporation step. It should be noted that the heat required by the evaporator may be less than the heat carried off by the decomposition products from the furnace.

As can be seen from the above, it is possible to recycle waste heat from the furnace to be used in the evaporation step, provided that the following three conditions are met: 1) the leachate solution is sufficiently concentrated (not less than 28 wt % $MgCl_2$); 2) the leachate stream enters the evaporator at not less than 100° C. and 3) proper insulation is applied such that heat losses are not significant.

The formed MgO solids at the end of the HCl regeneration step may then be transferred to the $CO_2$ mineralization stage, and the HCl may be reused in the acid leaching reaction.

Example 4: Mineralization of Carbon Dioxide

MgO obtained from the end of the previous stage may be contacted with aqueous ammonium carbonate (($NH_4)_2CO_3$) from a $CO_2$ scrubbing process to produce solid magnesium carbonate and aqueous ammonia (see Example 7 below for more information). The solid magnesium carbonate may be filtered off, yielding an ammonia solution that may be reused for $CO_2$ removal. The reaction for $CO_2$ removal from flue gas, via ammonia capture, is shown below (see Example 6 below for more information):

$$2NH_3(aq) + CO_2(g) + H_2O(l) \rightarrow (NH_4)_2CO_3(aq)$$

The $CO_2$ removal may be conducted in a packed scrubbing tower, in order to maximize the contacting surface area of the ammonia solution with $CO_2$ gas. The operating conditions and ratio of $NH_3$ to $CO_2$ should be controlled to stay within an optimal range, to avoid formation of by-products such as ammonium bicarbonate ($NH_4HCO_3$) and urea (($NH_2)_2CO$). The recommended molar ratio of $NH_3$ to $CO_2$ is about 2:1 to about 2.5:1.

Estimations based on HSC software indicate that the reaction between MgO and aqueous $(NH_4)_2CO_3$ may be favorable at ambient temperatures and pressures, and is exothermic:

TABLE 3

Simulation results from HSC for the reaction between MgO and $(NH_4)_2CO_3$
$MgO + (NH_4)_2CO_3(ia) = MgCO_3(M) + 2NH_3(a) + H_2O(l)$

| T (° C.) | ΔH (kJ) | ΔS (J/K) | ΔG (kJ) | K | Log(K) |
|---|---|---|---|---|---|
| 0.000 | −21.872 | 135.220 | −58.808 | 1.765E+011 | 11.247 |
| 10.000 | −19.546 | 143.582 | −60.201 | 1.278E+011 | 11.107 |
| 20.000 | −17.009 | 152.387 | −61.681 | 9.805E+010 | 10.991 |
| 30.000 | −14.338 | 161.344 | −63.249 | 7.929E+010 | 10.899 |
| 40.000 | −11.571 | 170.323 | −64.908 | 6.726E+010 | 10.828 |
| 50.000 | −8.732 | 179.246 | −66.656 | 5.960E+010 | 10.775 |
| 60.000 | −5.836 | 188.071 | −68.492 | 5.493E+010 | 10.740 |
| 70.000 | −2.893 | 196.777 | −70.417 | 5.246E+010 | 10.720 |
| 80.000 | 0.093 | 205.353 | −72.427 | 5.173E+010 | 10.714 |
| 90.000 | 3.118 | 213.798 | −74.523 | 5.250E+010 | 10.720 |
| 100.000 | 6.179 | 222.114 | −76.703 | 5.470E+010 | 10.738 |

Figure 2:
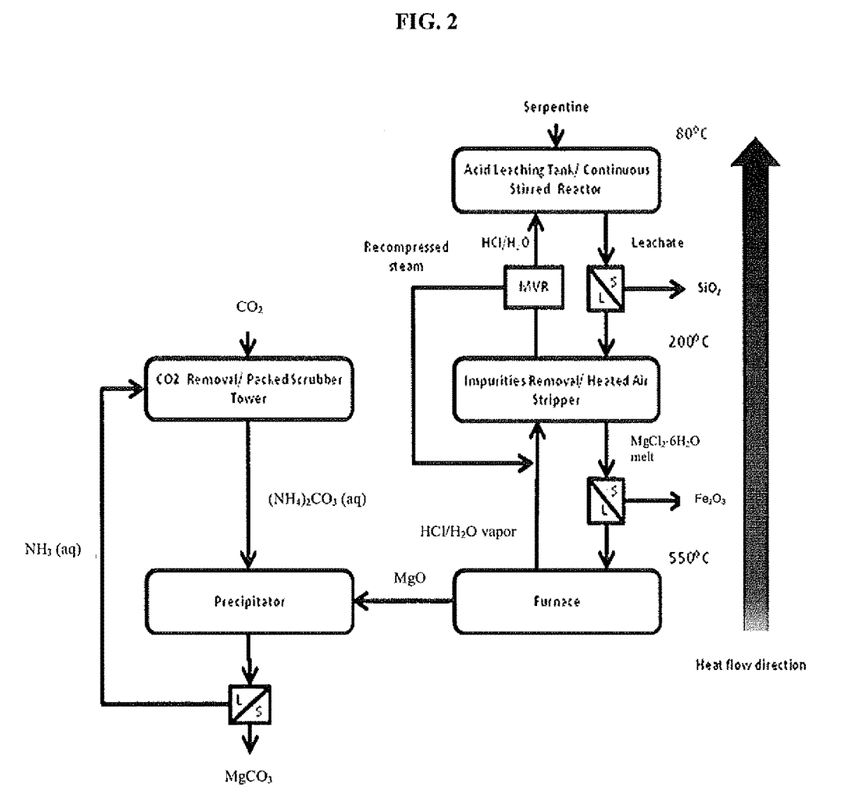
FIG. 2 is a schematic diagram showing process flow for a mineralization process according to an embodiment.

In conclusion, the entire process may be depicted by FIG. 2.

Example 5: Hydrolysis of Magnesium Chloride Hexahydrate to Magnesium Oxide

Figure 3:
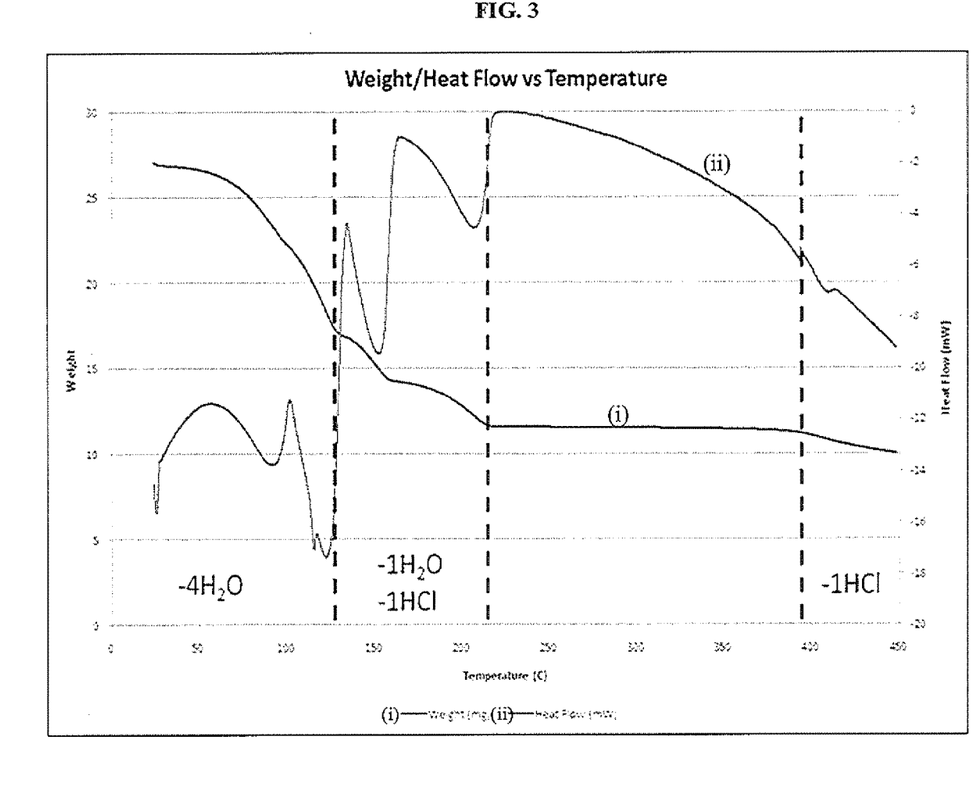
FIG. 3 is a graph showing thermogravimetric analysis (TGA) results of $MgCl_2 \cdot 6H_2O$. Y-axis: weight; x-axis: temperature (° C.).

Hydrolysis of $MgCl_2.6H_2O$ was studied via thermogravimetric analysis (TGA). Results are shown in FIG. 3.

As may be seen from the figure, the hexahydrate salt was dehydrated at temperatures up to 120° C., losing four moles of water per mole of $MgCl_2.6H_2O$. The resulting dihydrate salt underwent a first hydrolysis, liberating one mole of water and one mole of HCl to yield MgOHCl. The first hydrolysis was completed at around 220° C.

When further heated to 400° C., the hydroxychloride underwent a second hydrolysis, generating another mole of HCl and leaving behind a solid MgO residue.

Example 6: Reaction of Carbon Dioxide with Aqueous Ammonia

An experiment was conducted to demonstrate feasibility of aqueous ammonia as a sorbent for $CO_2$.

0.5 L of 6 M aqueous ammonia solution was prepared by diluting 0.225 L of stock aqueous ammonia (25 wt %) with 0.275 L deionized (DI) water. The solution was immersed in an ice bath and sparged with carbon dioxide gas (3 bar outlet pressure). The pH and temperature in relation to time was recorded in TABLE 4 below.

TABLE 4

Time, pH and temperature of aqueous ammonia solution

| Time (h) | pH | Temperature (° C.) |
|---|---|---|
| 0 | 13 | 12 |
| 0.5 | 12 | 7 |
| 1 | 11.61 | 4 |
| 2 | 11.31 | 8 |
| 3 | 10.98 | 4 |
| 4 | 10.75 | 4 |
| 5 | 10.58 | 4 |

It may be seen that aqueous ammonia may effectively absorb $CO_2$ under the right conditions. Note that the mass transfer and absorption rates may be significantly improved by using a suitably designed scrubber or gas/liquid contactor.

Example 7: Reaction of Magnesium Oxide with Ammonium Carbonate 14.4 grams (0.15 mols) of ammonium carbonate was dissolved in 150 ml DI water to produce a 1 M ammonium carbonate solution. 4 grams (0.1 mols) of magnesium oxide was added to this solution and stirred for 1 hour at ambient temperature and pressure. Warming of the solution occurred for the first half hour, suggesting that a carbonation reaction was taking place. After thirty minutes, an apparent cooling of the slurry to room temperature was observed.

Figure 4:
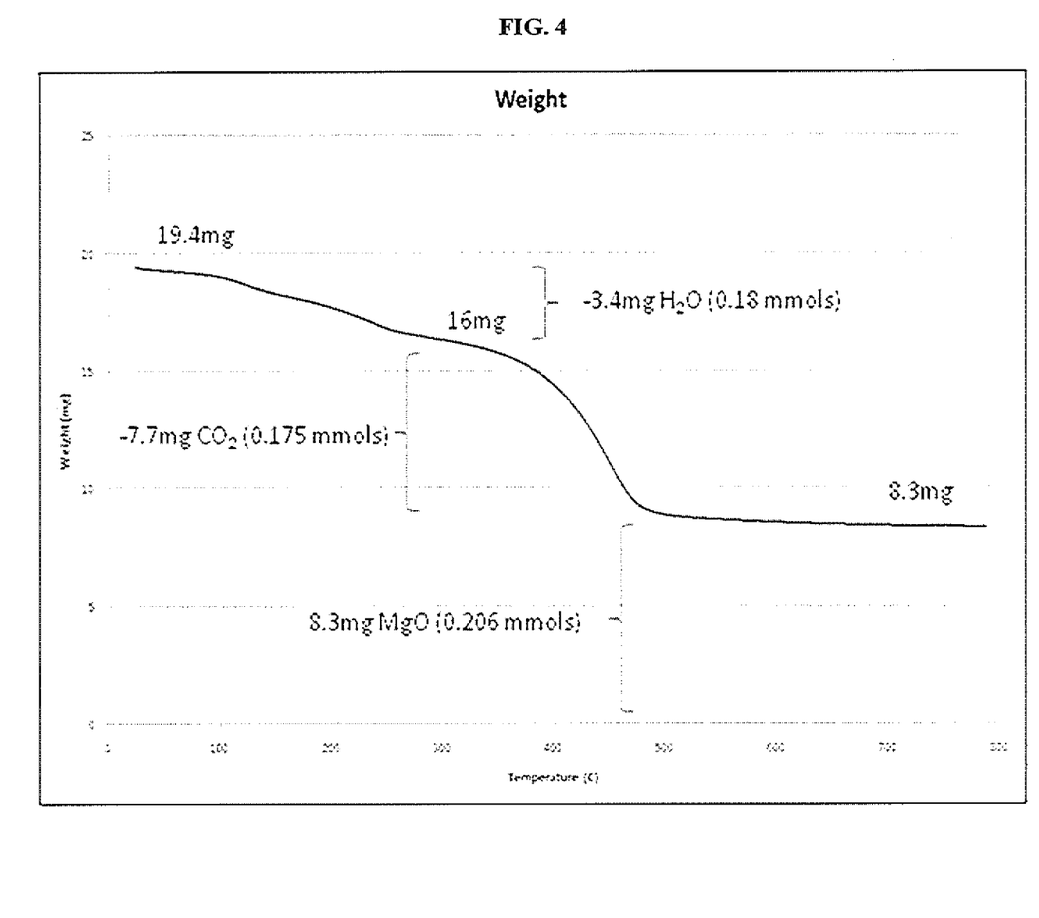
FIG. 4 is a graph showing TGA analysis of magnesium carbonate product from reaction of MgO with $(NH_4)_2CO_3$. Y-axis: weight (mg); x-axis: temperature (° C.).

The solids were filtered from the solution and dried in an oven overnight at 80° C. The dried solids were studied using thermogravimetric analysis (TGA) to determine the degree of carbonation. The results are shown in FIG. 4.

The results from the figure show that the sample underwent a slow dehydration at temperatures up to 250° C., and loss of $CO_2$ at temperatures above 400° C.

Calculations from the data also indicated a $H_2O:CO_2$:MgO ratio of 0.87:0.85:1, suggesting a species similar in composition to hydromagnesite $(Mg_5(CO_3)_4(OH)_2.4H_2O)$.

Example 8: Exemplary Embodiment of a System

FIG. 5 is a schematic diagram showing general process flow for a system to carry out mineralization process according to embodiments.

An aqueous leaching process involving HCl and alkaline-earth silicate minerals may take place in R1. The leaching process in R1 may involve reacting aqueous HCl solution with alkaline-earth silicate minerals at not less than 27 wt % HCl and 80° C. to extract the alkaline-earth elements into a leachate solution from the minerals.

The leachate solution (Si) from R1 may be subjected to purification by stripping unreacted HCl from the leachate to precipitate impurities from the liquid phase, which may take place in R2.

Removal of impurities in R2 may be aided by oxidation of any intermediate species, for example from ferrous to ferric iron, such that they are more easily removed. The oxidation step in R2 may be conducted by introduction of air or oxygen into the leachate solution.

Stripping of HCl in R2 may be controlled such that the pH of the leachate solution goes up to, but does not exceed 9. Stripping of HCl in R2 may be conducted in a temperature range of 150° C. to 250° C., more preferably 180° C. to 200° C. The purified leachate solution from R2 may be subjected to evaporation to produce $MgCl_2$ hydrates, where the water of crystallization is between the numbers of 2 to 6.

The above-mentioned chemical transformations may be conducted in a single reactor R2, which may be a heated air stripper. The heated air stripper R2 may be maintained at a temperature not less than 180° C., preferably at 200° C. or more. The evaporated water (S4) from R2 may be recycled to the leaching process in R1. The produced $MgCl_2$ hydrates (S2) from R2 may be subjected to thermal hydrolysis in a furnace R3 to yield MgO (S5), HCl and water vapor. The HCl and water vapor from R3 (S3) may be used as a heating medium for the heated air stripper R2. The HCl and water from R2 (S4) may be recycled to the leaching process in R1.

A mechanical vapor recompressing mechanism may be used to compress exiting HCl and water vapor S4 from the heated air stripper R2. The recompressed HCl and water vapor (S4-1) may be used to supplement the heating medium.

The aqueous $(NH_4)_2CO_3$ solution (S6) may be obtained by reacting aqueous $NH_3$ solution with $CO_2$ in flue gas from a $CO_2$ point source, such as a power plant.

The $CO_2$ capture reaction in R4 may be conducted in a gas-liquid contacting tower with sufficient packing. The carbonation reaction may be reacted at pH not less than 9, and preferably above 10, to maximize the degree of carbonation.

The resulting aqueous $NH_3$ solution from R5 (S7) may be recycled to the scrubbing process in R4.

Various embodiments described herein is suitable for mitigation of $CO_2$ emissions from all kinds of industrial sectors, such as power plants, cement plants, and steel plants, without significant modification of existing infrastructure. At the same time, the products may be used as building materials or additives to polymers as fire retardants. Particularly, various embodiments disclosed herein are suitable for long-term sequestration of $CO_2$ emitted from local power plants and the carbonation products, carbonates and sand are utilized for land reclamation purposes in Singapore.

The predicted amount of $CO_2$ from local power plants for the next decade (see TABLE 1) exceeds approximately 20 million tonnes per year, which may produce about 60 million tonnes or 25 million $m^3/a$ of carbonate and sand by this $CO_2$ sequestration process. On an average scale, the landfill area is projected to expand by 1 $km^2$ per year for the next 10 years. Therefore, various embodiments disclosed herein for application to mineral carbonation process is viewed as a promising approach which provides environmental benefits particularly for Singapore.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of producing a metal carbonate from an ultramafic rock material, the method comprising
   a) providing an ultramafic rock material comprising a metal silicate;
   b) reacting the ultramafic rock material with an acid to form a mixture comprising a salt of the metal;
   c) contacting the mixture comprising a salt of the metal with oxygen so as to aerate impurities in the mixture and/or remove residual acid from the mixture;
   d) heating the resultant mixture from step c) to decompose the salt of the metal to form metal oxide; and
   e) reacting the metal oxide with aqueous ammonium carbonate to obtain the metal carbonate.

2. The method according to claim 1, wherein molar ratio of metal to $CO_3$ in the metal carbonate is in the range of about 1:1 to about 5:4.

3. The method according to claim 1, wherein the metal carbonate is magnesium carbonate.

4. The method according to claim 1, wherein the ultramafic rock material comprises serpentine.

5. The method according to claim 1, wherein the acid is a hydrohalic acid.

6. The method according to claim 1, wherein the acid comprises hydrochloric acid.

7. The method according to claim 6, wherein concentration of the hydrochloric acid is at least 27 wt % HCl.

8. The method according to claim 1, wherein reacting the ultramafic rock material with an acid is carried out at a temperature in the range of about 80° C. to about 100° C.

9. The method according to claim 1, wherein contacting the mixture comprising a salt of the metal with oxygen is carried out at a temperature in the range of about 150° C. to about 250° C.

10. The method according to claim 1, wherein contacting the mixture comprising a salt of the metal with oxygen is carried out under conditions such that pH of the mixture is less than or equal to 9.

11. The method according to claim 1, wherein contacting the mixture comprising a salt of the metal with oxygen is carried out for a time period suitable to form a mixture saturated with the salt.

12. The method according to claim 1, further comprising removing water from the resultant mixture from step c) prior to step d) to form a hydrated salt of the metal.

13. The method according to claim 1, wherein reacting the metal oxide with aqueous ammonium carbonate is carried out at ambient conditions.

14. The method according to claim 1, wherein the aqueous ammonium carbonate is obtained by reacting carbon dioxide with aqueous ammonia in a gas-liquid packed column.

15. The method according to claim 14, wherein molar ratio of aqueous ammonia to carbon dioxide is in the range of about 2:1 to about 2.5:1.

16. A system for producing a metal carbonate from ultramafic rock material, the system comprising
   a) a reactor configured to carry out reaction of an ultramafic rock material with an acid to form a mixture comprising a salt of the metal;
   b) an air stripper column configured to contact the mixture comprising a salt of the metal with oxygen so as to aerate impurities in the mixture and/or to remove residual acid from the mixture;
   c) a furnace configured to heat the resultant mixture from step b) to decompose the salt of the metal to form the metal oxide; and
   d) a precipitator configured to carry out reaction of the metal oxide with aqueous ammonium carbonate to obtain the metal carbonate.

17. The system according to claim 16, further comprising a gas-liquid packed column arranged upstream of the precipitator and configured to carry out reaction of carbon dioxide with aqueous ammonia to form aqueous ammonium carbonate.

18. The system according to claim 17, further comprising recycling means configured to recycle aqueous ammonia from the precipitator to the gas-liquid packed column.

19. The system according to claim 16, further comprising a compressor configured to compress acid vapor and/or water vapor from the air stripper column.

20. The system according to claim 16, further comprising recycling means configured to recycle acid vapor and/or water vapor from the air stripper column and/or the furnace to the reactor and/or the air stripper column.

* * * * *